United States Patent
Bonnet

(10) Patent No.: US 6,304,273 B1
(45) Date of Patent: Oct. 16, 2001

(54) PROCESS FOR DEPICTING PATHS WITHIN A GRAPHICAL REPRESENTATION OF A NETWORK

(75) Inventor: Dominique Bonnet, Sceaux (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 09/083,588

(22) Filed: May 22, 1998

(30) Foreign Application Priority Data

May 23, 1997 (FR) .................................................. 97 06310

(51) Int. Cl.$^7$ ...................................................... G06T 1/00
(52) U.S. Cl. .......................... 345/440; 345/441; 345/442; 345/115; 345/116
(58) Field of Search .................................. 345/440, 441, 345/442, 134, 335, 115, 116

(56) References Cited

U.S. PATENT DOCUMENTS

| | | | | |
|---|---|---|---|---|
| 5,136,690 | * | 8/1992 | Becker et al. ......................... | 395/161 |
| 5,270,919 | * | 12/1993 | Blake et al. ........................... | 364/401 |
| 5,276,789 | * | 1/1994 | Besaw et al. .......................... | 395/140 |
| 5,440,675 | * | 8/1995 | Matsunaga et al. .................. | 395/140 |
| 5,450,535 | * | 9/1995 | North ..................................... | 395/140 |
| 5,515,487 | * | 5/1996 | Beaudet et al. ....................... | 395/140 |
| 5,623,590 | * | 4/1997 | Becker et al. ......................... | 395/326 |
| 5,651,105 | * | 7/1997 | Willman ................................ | 395/140 |
| 5,768,552 | * | 6/1998 | Jacoby .................................. | 395/334 |
| 5,845,277 | * | 12/1998 | Pfeil et al. ............................. | 707/3 |
| 5,870,706 | * | 2/1999 | Alshawi ................................ | 704/255 |
| 5,910,803 | * | 6/1999 | Grau et al. ............................ | 345/357 |
| 6,112,015 | * | 8/2000 | Planas et al. ..................... | 395/200.53 |

FOREIGN PATENT DOCUMENTS

| | | |
|---|---|---|
| 0 412 692 | 2/1991 | (EP) . |
| 0 460 843 | 12/1991 | (EP) . |

OTHER PUBLICATIONS

R.S. Wetmore, "AT&T's World–Class Network Trafic Management System", AT&T Technology, vol. 6, No. 3, New York, 1991, pp. 38–43.

H. Fuji et al, Dualquest: Real–Time Bifocal Network Visualization System>>, IEICE Transactions on Communications, vol. E78–B(1995), No. 1, Tokyo, Jan. 1, 1995, pp. 68–73.

* cited by examiner

Primary Examiner—Matthew Luu
Assistant Examiner—Daniel J Chung
(74) Attorney, Agent, or Firm—Marshall, Gerstein & Borun

(57) ABSTRACT

In order to depict a set of paths which are available for transporting a stream from a first node (1) to a second node (6) of the network, one or more perimeters are placed around each symbol designating a departure node of an elementary link of a path of the set, and a respective flag is placed at the intersection between each arc designating an elementary link of the set of paths and a perimeter surrounding the symbol designating the departure node of said elementary link. This depiction technique permits clear visualization of various routing conditions, in a manner which is independent of the positions of the nodes in the graphical representation of the network. It is particularly well suited to computer tools for assisting the design or simulation of networks.

3 Claims, 1 Drawing Sheet

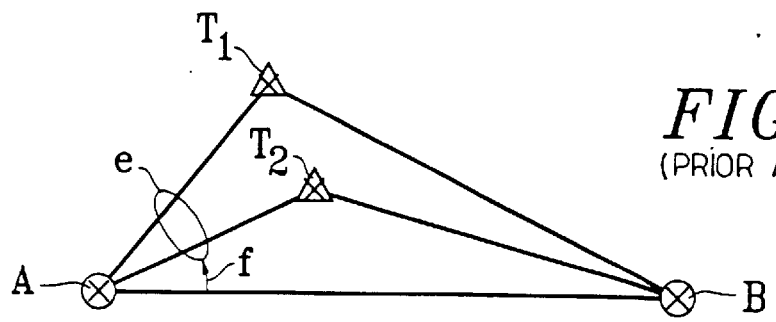
FIG.1
(PRIOR ART)
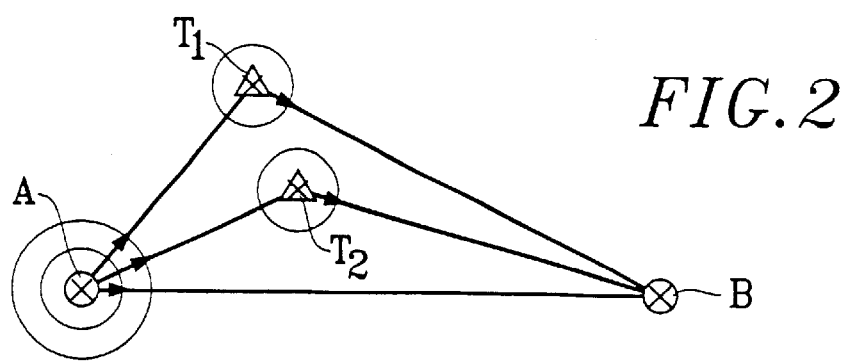
FIG.2
FIG.3
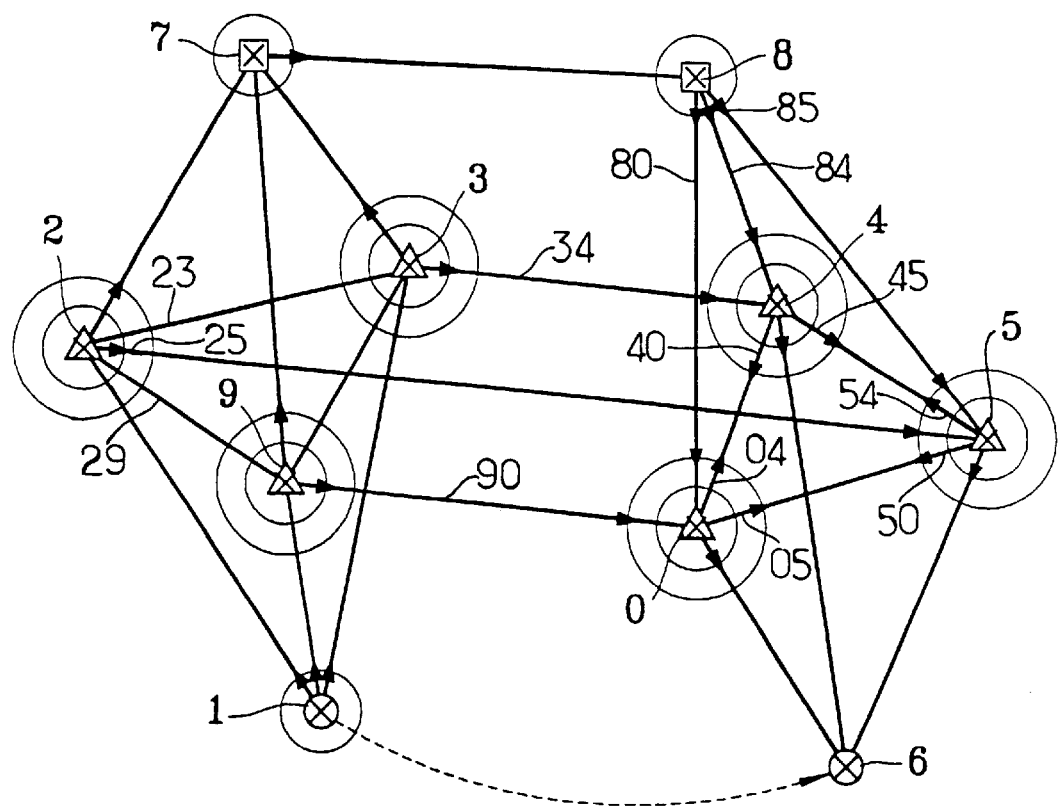

PROCESS FOR DEPICTING PATHS WITHIN A GRAPHICAL REPRESENTATION OF A NETWORK

BACKGROUND OF THE INVENTION

The present invention relates to the field of the graphical representation of networks, and more precisely to a process for depicting, within such a representation, a set of paths which are available in order to undertake a routing between two nodes of the network.

The networks represented may be of very diverse kinds. The example more particularly envisaged by the Applicant concerns telecommunication networks. Other examples would be energy transport or fluid distribution networks, etc.

In a natural way, the graphical representation of such a network comprises symbols designating nodes of the network (for example, switches in the case of a telecommunication network), which are connected together by arcs designating elementary links existing between nodes of the network (for example, bundles of cables, optical or radio-relay fibers, etc.).

When the network comprises many nodes and many links, this very frequently being the case, its representation becomes complex and difficult to read. In particular, the depicting of the paths available to transport a stream (of information, of signals, of energy, of fluid etc.) from one node to another is a problem which is difficult to solve in a clear and unambiguous manner.

It is just such a set of paths available for transporting a stream from a first node to a second node of the network which it is proposed to depict according to the invention. This set of paths obeys the following topological rules:

- each path of the set includes, between the first node and the second node, an elementary link or a succession of elementary links each having a respective departure node and a respective arrival node,
- the first node constitutes the departure node of an elementary link of each path,
- the second node constitutes the arrival node of an elementary link of each path, and
- each arrival node of an elementary link of a path of the set other than said second node constitutes the departure node of another elementary link of said path.

Moreover, it may be necessary to display certain routing rules on the depiction of the set of paths, these rules applying within this set. Among these rules may be mentioned load sharing as well as the modes of behavior to be adopted in the event of an overflow on a link. FIG. 1 illustrates a conventional way of representing a set of paths between a node A and a node B together with such rules. In this example, the normal route between nodes A and B consists in taking the direct link AB. However, in the event of an overflow of capacity on this direct link, the streams to be routed from node A to node B may take either the path $AT_1B$, or the path $AT_2B$. The sharing of the overflow load between the elementary links $AT_1$ and $AT_2$ is represented by the ellipse e drawn around the arcs designating these two elementary links, and the arrow f emanating from the arc AB is an overflow indicator which makes it possible to depict the appropriate behavior in the event of an overflow on the link AB.

The depiction technique illustrated by FIG. 1 has several practical limitations. For certain arrangements of the nodes within the representation, the route is incomprehensible. For example, in FIG. 1, if node B is placed between nodes $T_1$ and $T_2$, the representation of the route is no longer comprehensible. However, the option of modifying the position of the nodes in order to avoid such ambiguities is not always available: such is the case, in particular, when the position of the nodes reflects the geography of the sites of the network. Furthermore, this depiction technique does not bind a choice of route to the node on exit from which this choice is made, but to the arcs representing the links concerned. This makes it difficult to track the paths taken by the stream from end to end. Another limitation is that it is not possible to display clearly the fact that a choice of route on exiting a node can be conditioned by the link via which the stream has reached this node.

An object of the present invention is to improve the techniques for depicting paths within graphical representations of networks by simultaneously endowing them with greater visibility and larger richness of representation.

SUMMARY OF THE INVENTION

The invention thus proposes a process, as defined above, for depicting a set of paths, comprising the following steps: surrounding each symbol designating a departure node with at least one respective perimeter; and placing a respective flag at the intersection between each arc designating an elementary link of the set of paths and a perimeter surrounding the symbol designating the departure node of said elementary link.

Each perimeter surrounding a departure node manifests a choice of route on exit from this node. For example, a sharing of the load between two elementary links having this node as departure node will be readily depicted by the presence of a flag at the intersections between this perimeter and the arcs designating these elementary links.

The routing priorities and the overflow indicators can be depicted by placing several concentric perimeters around the nodes concerned. A preferred mode of execution of the process according to the invention thus allows the depiction of a set of paths such that at least one node of the network constitutes a departure node common to several elementary links among which at least one main link has priority over at least one auxiliary link, with the aid of the following operations: surrounding the symbol designating said common departure node with two concentric perimeters; placing the flag relating to each main link having said common departure node at the intersection between the arc designating said main link and one of the concentric perimeters; and placing the flag relating to each auxiliary link having said common departure node at the intersection between the arc designating said auxiliary link and the other concentric perimeter.

This procedure is easily generalized to any number of levels of priority on exit from the common departure node. It is sufficient to draw as many concentric perimeters as there are levels of priority, for example circles whose diameter increases (or decreases) with the priority. An overflow of capacity is then shown by the transition from one circle to that of immediately greater (or lesser) diameter. Hence, this gives great flexibility in the representation of priorities and overflows of capacity. The clarity of this representation is achieved by means of graphical elements which are very simple to use and to depict, and it is not affected by the relative positions of the nodes concerned, unlike the depiction technique illustrated by FIG. 1.

Advantageously, the invention also allows the representation of routing constraints such as upstream constraints. It is thus possible to prevent the depicting of a set of paths from being automatically accompanied by the depicting of other paths which do not belong to this set.

A node is said to be the subject of an upstream constraint if a choice of route on exit from this node is conditioned by the elementary link via which the stream has reached this node. In terms of defining the set of paths to be depicted, an upstream constraint condition corresponds to the fact that the set of paths comprises at least first and second paths passing through the same constrained node and each including a respective elementary arrival link whose said constrained node constitutes the arrival node and a respective elementary departure link whose said constrained node constitutes the departure node, and no path of the set to be depicted simultaneously includes the elementary arrival link of the first path and the elementary departure link of the second path.

A flag of another type is now placed on a perimeter surrounding the symbol designating the constrained node and having a flag at the intersection with the arc designating the elementary departure link of the second path, at the intersection with the arc designating the elementary arrival link of the second path, and no flag of the other type is placed at the intersection with the arc designating the elementary arrival links of the first path.

In the absence of such provisions, the graphical representation of the network would lead to the conclusion that the elementary departure link of the second path can be taken irrespective of the upstream journey, which is not in accordance with the desired routing rules.

BRIEF DESCRIPTION OF THE DRAWINGS

FIG. 1 is a graphical representation of a network according to a prior technique;

FIGS. 2 and 3 are two graphical representations of networks which can be obtained by implementing the process according to the invention.

DESCRIPTION OF PREFERRED EMBODIMENTS

The process according to the invention is generally implemented within a computer system allowing the graphical representation of networks. This system typically constitutes a simulation tool or a design aid for the architect or manager of the network. The graphical representations produced can be used in their raw state to depict the structure and/or the attributes of the network. Advantageously, portraying them on a computer screen additionally enables the user, within the context of an object-oriented user interface, to provide the system with the routing attributes in tandem with the construction of the network.

In this regard, the drawing of a perimeter, such as a circle, around each node of the network constituting the departure node of an elementary link of a path of the set to be depicted, this perimeter manifesting a choice of route on exiting this node, is a valuable aid. The user will merely need, with the aid of his graphical interface, to select the perimeter in question (for example by clicking with the aid of a mouse) in order to initiate a dialogue with the system enabling him to define or modify the parameters of this choice of route, which parameters will dictate the rules of behavior which the equipment of the network located at the node in question will have to obey. Since the routing rules must be specified at the level of this equipment (switches in the case of a telecommunication network or equipment having comparable routing functions in the case of other networks), the mode of representation according to the invention is much more convenient for the user than that illustrated by FIG. 1 in which the routing choices are depicted at arc level.

The program portions used to draw the perimeters and place the appropriate flags around the symbols designating the nodes of the network are not difficult to write in the language employed to construct the graphical representations within the system. These graphical methods are well known and will not be described here.

FIG. 2 is a graphical representation of the same network as that of FIG. 1, depicting the same set of paths going from node A to node B. The symbol designating each departure node to be depicted A, $T_1$, $T_2$ is surrounded by one or more perimeters, each perimeter being a circle in the example represented.

In the absence of priority relations between the elementary links exiting from a given node, the symbol representing this node $T_1$, $T_2$ is surrounded by a single circle, the intersection of which with the outgoing link is provided with a flag which, in the non-limiting example represented, consists of a triangle forming an arrow pointing away from the node in question.

Node A is a departure node which is common to several elementary links to be depicted. Among them, the elementary link AB has priority, this being depicted by a flag pointing from the symbol of node A towards that of node B and placed at the intersection between the arc AB and the circle of smallest diameter surrounding node A, and the elementary links $AT_1$ and $AT_2$ are auxiliary links which share the overflow load from the main link AB, this being depicted by two flags pointing from the symbol of node A towards those of nodes $T_1$ and $T_2$ and placed at the intersections between the arcs $AT_1$ and $AT_2$ and the circle of largest diameter surrounding the symbol of node A.

It should be pointed out that the clarity of the representation of the network and of the depicting of the paths is in no way affected if node B lies between nodes $T_1$ and $T_2$.

The less schematic example of FIG. 3 shows the graphical representation of a network of ten nodes designated by the numerical references 0 to 9, and depicts the set of paths which can be used to transport a stream from node 1 to node 6, as indicated by the dashed arrow.

Nodes 0, 4 and 5 are constrained nodes. Only streams which reach node 0 via the elementary link 80 or 90 can leave node 0 along the elementary links 04 and 05. To depict this condition relating to the choice of route 04 or 05 on exit from node 0, flags of some other type (triangles forming an arrow pointing towards the node in question, in the non-limiting example represented) are placed at the intersections between the circle bearing the flags for the outgoing links 04, 05 to which this choice of route pertains and the arcs designating the conditioning links 80 and 90. The same method is applied for nodes 4 and 5: only streams which reach node 4 via the elementary link 34 or 84 can leave node 4 along the elementary links 40 and 45, and only streams which reach node 5 via the elementary link 25 or 85 can leave node 5 along the elementary links 50 and 54.

In the graphical representation of FIG. 3, the set of paths depicted is made up of the following paths: 1256, 1346, 1906, 12546, 12506, 13456, 13406, 19046, 19056, 1i7846, 1i7856, 1i7806, 1i78456, 1i78406, 1i78546, 1i78506, 1i78046 and 1i78056, with i=2, 3 or 9, the first three paths being taken by priority, and the others capable of being so in the event of an overflow on certain elementary links. Certain paths (for example 134056) are excluded from the set depicted, whereas it would not be possible for them to be so in the absence of provisions for displaying the upstream constraints.

It should be noted that, despite the relative complexity of this depicted set, which reflects the richness of the routing options available to the network manager, the graphical representation of the routes remains clear and easily modifiable by the user. The latter need merely click on the symbol designating a node or on the circle or perimeter designating a choice of route made at node level in order to be able to modify the operating parameters thereof. Moreover, the depicting of the set of paths has not made it necessary to delete, from the overall graphical representation of the network, certain links which may exist within the network but without belonging to paths of the set to be depicted. Such is the case for links 23, 29 and 39 in the example represented in FIG. 3.

What is claimed is:

1. Process for depicting paths within a graphical representation of a network, said graphical representation comprising symbols and arcs, the symbols being connected together by the arcs, the symbols designating nodes of the network, and the arcs designating elementary links existing between said nodes, in which a set of paths available for transporting a stream from a first one of said nodes to a second one of said nodes is depicted, said set being such that:

each path includes, between the first node and the second node, an elementary link or a succession of elementary links each having a respective departure node and a respective arrival node among said nodes, said first node constitutes the departure node of an elementary link of each path, said second node constitutes the arrival node of an elementary link of each path, and each arrival node of an elementary link of a path of the set other than said second node constitutes the departure node of another elementary link of said path, said process comprising the steps of:

surrounding each symbol designating a departure node with at least-one respective perimeter; and placing a respective flag at an intersection between each arc designating an elementary link of the set of paths and a perimeter surrounding the symbol designating the departure node of said designated elementary link.

2. Process for depicting paths according to claim 1, wherein the set of paths is such that at least one node of the network constitutes a departure node common to several elementary links, among which at least one main link has priority over at least one auxiliary link, the process further comprising the steps of:

surrounding the symbol designating said common departure node by first and second concentric perimeters, placing the flag relating to each main link having said common departure node at an intersection between the arc designating said main link and the first concentric perimeter, and placing the flag relating to each auxiliary link having said common departure node at an intersection between the arc designating said auxiliary link and the second concentric perimeter.

3. Process for depicting paths according to claim 1, wherein the set of paths comprises at least first and second paths each passing through a constrained node and each including a respective elementary arrival link of which said constrained node constitutes the arrival node and a respective elementary departure link of which said constrained node constitutes the departure node, and wherein no path of the set to be depicted simultaneously includes the elementary arrival link of the first path and the elementary departure link of the second path, and wherein, on a perimeter surrounding the symbol designating the constrained node and having a flag at an intersection with the arc designating the elementary departure link of the second path, a flag of another type is further placed at an intersection with the arc designating the elementary arrival link of the second path, and no flag of the other type is placed at an intersection with the arc designating the elementary arrival link of the first path.

\* \* \* \* \*